United States Patent
Shi et al.

(10) Patent No.: US 6,211,104 B1
(45) Date of Patent: Apr. 3, 2001

(54) CATALYST FOR CATALYTIC PYROLYSIS PROCESS FOR THE PRODUCTION OF LIGHT OLEFINS AND THE PREPARATION THEREOF

(75) Inventors: Zhicheng Shi; Fengmei Zhang; Shunhua Liu, all of Beijing (CN)

(73) Assignees: China Petrochemical Corporation; Research Institute of Petroleum Processing, SINOPEC, both of Beijing (CN)

( * ) Notice: Subject to any disclaimer, the term of this patent is extended or adjusted under 35 U.S.C. 154(b) by 0 days.

(21) Appl. No.: 09/172,649

(22) Filed: Oct. 15, 1998

(30) Foreign Application Priority Data

Oct. 15, 1997 (CN) .................................................. 97119012

(51) Int. Cl.⁷ ..................................................... B01J 29/06
(52) U.S. Cl. ................................ 502/67; 502/64; 502/66; 502/68; 502/71; 502/79
(58) Field of Search ................................ 502/63, 64, 66, 502/67, 68, 71, 79

(56) References Cited

U.S. PATENT DOCUMENTS

| | | | | |
|---|---|---|---|---|
| 4,137,195 | * | 1/1979 | Chu | 502/85 |
| 4,357,264 | * | 11/1982 | Chu | 502/85 |
| 4,548,914 | * | 10/1985 | Chu | 502/85 |
| 4,976,847 | | 12/1990 | Maxwell et al. . | |
| 4,977,122 | * | 12/1990 | Eberly | 502/69 |
| 4,980,053 | | 12/1990 | Li et al. . | |
| 5,194,412 | * | 3/1993 | Roberie et al. | 502/64 |
| 5,288,739 | * | 2/1994 | Demmel | 502/63 |
| 5,302,567 | | 4/1994 | Miller et al. . | |
| 5,326,465 | * | 7/1994 | Yongqing et al. | 208/120 |
| 5,358,918 | * | 10/1994 | Yukang et al. | 502/67 |
| 5,380,690 | | 1/1995 | Zhicheng et al. . | |
| 5,670,037 | | 9/1997 | Zaiting et al. . | |
| 5,951,963 | * | 9/1999 | He et al. | 423/713 |
| 5,958,818 | * | 9/1999 | Demmel et al. | 502/68 |

FOREIGN PATENT DOCUMENTS

| | | |
|---|---|---|
| 1069016 | 2/1993 | (CN) . |
| 1083092 | 3/1994 | (CN) . |
| 93102783 | 10/1994 | (CN) . |
| 152356 | 11/1981 | (DE) . |
| 225135 | 7/1985 | (DE) . |
| 60-222428 | 11/1985 | (JP) . |
| 1214726 | 1/1984 | (SE) . |

OTHER PUBLICATIONS

Chemical Abstracts, vol. 114, No. 16, Apr. 22, 1991, Abstract No. 145779.

* cited by examiner

*Primary Examiner*—Tom Dunn
(74) *Attorney, Agent, or Firm*—Birch, Stewart, Kolasch & Birch, LLP.

(57) ABSTRACT

A catalyst for catalytic pyrolysis process for the production of light olefins comprises 10~70 wt % (based on the weight of catalyst) of clay, 5~85 wt % of inorganic oxides and 1–50 wt % zeolite, wherein said zeolite is a mixture of 0~25 wt % of Y type zeolite and 75~100 wt % of phosphorus and aluminum or phosphorus and magnesium or phosphorus and calcium containing high silica zeolite having a structure of pentasil; said pentasil high silica zeolite being one selected from the group consisting of ZSM-5, ZSM-8 and ZSM-11 of zeolites containing 2~8 wt % of phosphorus and 0.3~3 wt % of aluminum or magnesium or calcium (calculated as the oxides), having a silica/alumina mole ratio of 15–60. The catalyst exhibits excellent activity stability and high yields of light olefin, especially for $C_2^=$. It can at the same level of yields of light olefins as that of steam thermal cracking at a lower reaction temperature than that of steam thermal cracking.

13 Claims, No Drawings

CATALYST FOR CATALYTIC PYROLYSIS PROCESS FOR THE PRODUCTION OF LIGHT OLEFINS AND THE PREPARATION THEREOF

FIELD OF THE INVENTION

This present invention relates to a petroleum hydrocarbon catalytic pyrolysis catalyst for producing light olefins, and the process for preparing the same, and more particularly to a petroleum hydrocarbon catalytic pyrolysis catalyst for producing mainly ethylene, propylene, and also butylene as by-products.

BACKGROUND OF THE INVENTION

The traditional method for the production of ethylene from petroleum hydrocarbon is by steam thermal cracking in tubular furnace. The feeds adopted in steam thermal cracking are ethane, propane, butane, naphtha or atmospheric gas oil (AGO). The method using heavier hydrocarbon thermal cracking on solid heat carrier for producing ethylene also exists. The heat carriers generally adopted are inert solid particles such as quartz sand, coke, coke carbon, etc.

Quite a few literatures reported the methods relating the production of light olefins by petroleum hydrocarbon cracking or pyrolysis conversion with catalysts. U.S. Pat. No. 3,541,179, U.S. Pat. No. 3,647,682, DD 225,135 and SU 1,214,726 adopt the oxides supported metal catalysts, wherein the support can be $SiO_2.Al_2O_3$ or other oxides and the metal components are selected from elements of $II_B$, $V_B$, $VII_B$ and $VIII_B$ groups. As the supported metal possesses dehydrogenation property, it also accelerates the condensation and coking reaction during the reaction process of cracking. Hence, this type of catalysts can only be used for processing light feed stocks (<220° C.). Some patents adopt the composite oxides as catalysts, for example, U.S. Pat. No. 3,725,495 and U.S. Pat. No. 3,839,485 reported the catalysts comprising mainly $ZrO_2$ and/or $HfO_2$, and also $Al_2O_3$, $Cr_2O_3$, $MnO_2$ and/or $Fe_2O_3$ and alkali and alkaline metal oxides. Although alkali and alkaline earth metal oxide catalysts can promote the yield of ethylene, quite a lot of CO and $CO_2$ will be formed simultaneously.

In the field of the production of light olefins by petroleum hydrocarbon cracking with solid acid catalyst, DD 152,356A adopts the amorphous $SiO_2.Al_2O_3$ catalyst for cracking various liquid hydrocarbon and hydrocarbon fractions including gasoline, kerosene, gas oil or vacuum distillates, at 600~800° C. to produce light olefins with a $C_2^=$~$C_4^=$ olefin yield of 40~50 wt % based on the feed. JP 60-224,428 disclosed a cracking catalyst using HZSM-5 as active component and alumina as matrix, for catalytic cracking a feed stock of $C_5$~$C_{25}$ paraffinic hydrocarbons at 600~750° C. to obtain a $C_2^=$~$C_4^=$ olefin yield of roughly 30 wt %. U.S. Pat. No. 3,758,403 revealed that a catalyst comprising both ZSM-5 zeolites and a large pore zeolite (e.g. X type or Y type) as active components in a ratio of 1:10~3:1 displayed a performance of raising gasoline octane number while increasing $C_3^=$~$C_4^=$ olefin yield to about 10 wt %. In CN1069016A, a catalyst comprising 30~90 wt % $SiO_2$, 20~70 wt % $Al_2O_3$, 0.5~30 wt % alkali and alkaline earth metal oxides and 1~30 wt % faujasite can produce 17~27 wt % yield of $C_2^=$, 30~40 wt % yield of $C_2^=$~$C_4^=$ at 650~900° C. with the heavy hydrocarbon as feedstock. In U.S. Pat. No. 4,980,053, a catalyst comprising HZSM-5 as active component supported on kaolin matrix obtained 40 wt % yield of $C_3^=$+$C_4^=$ by cracking the heavy hydrocarbon feed at 500~650° C., but the yield of $C_2^=$ was low. In CN1083092A, an acidic molecular sieve catalyst containing crosslinking pillared interlayedrectorite molecular sieve and/or rare earth pentasil high silica zeolite is used for cracking heavy hydrocarbons at 680–780 and obtains a yield of 23 wt $C_2$ and 50 wt/$C_2$–$C_4$, U.S. Pat. No. 5,380,690 and ZL CN93102783.7 revealed a catalyst using a Y type zeolite and a phosphorus and rare earth containing high silica zeolite having a structure of pentasil as active components, and this catalyst with heavy oil fractions as feed stock can increase at 500~600° C. the gasoline octane number as well as the yield of $C_2^=$~$C_4^=$, mainly the yield of $C_3^=$ and $C_4^=$.

The object of the present invention is to provide a novel zeolite-containing catalyst, said catalyst can attain the same level of yield of light olefins as that of steam thermal cracking at a lower reaction temperature than that of steam thermal cracking.

Another object of the present invention is to provide a method for preparing the said catalyst.

The further objects including the application of the said catalyst can be all learned from the content of the specification of the present invention including the examples.

The present invention provides a catalyst comprising a phosphorus—aluminum, phosphorus—magnesium or phosphorus—calcium containing high silica zeolite having the structure of pentasil prepared The phosphorus existing in the zeolite enables the zeolite to have higher hydrothermal activity-stability; aluminum or magnesium or calcium existing in the zeolite can adjust the acidity of the zeolite, which is favorable to the formation of $C_2^=$. During the catalytic pyrolysis process in the presence of an acidic catalyst, hydrocarbon cracking reaction is carried out based on the carbonium ion reaction mechanism, hence the light olefins produced are mainly $C_3^=$ and $C_4^=$. $C_2^=$ is commonly formed by free radical reaction mechanism in thermal cracking hydrocarbons, therefore acidic catalyst is unfavorable for the formation of $C_2^=$. The acidity of the zeolite of the present invention is appropriately adjusted, thus the catalyst of the invention not only decreases the activation energy of the hydrocarbon cracking reaction, and consequently the reaction can proceed at a lower temperature than tat of steam thermal cracking, but also increases the yield of $C_2^=$.

The present invention provides a catalyst comprising 10~70 wt % (based on the weight of the catalyst) of clay, 5~85 wt % of inorganic oxides, and 1~50 wt % of zeolite, said zeolite is a of 0~25 wt % of Y type zeolite and 75~100 wt % phosphorus—aluminum, phosphorus—magnesium or phosphorus—calcium containing high silica zeolite having a structure of pentasil.

Said clay in the catalyst of the invention can be all kind of clays usually used as a carrier for cracking catalyst, either natural or synthesized such as kaolin and kaolin polyhydrate, and may optionally be subjected to various chemical and/or physical treatment.

Said inorganic oxides in the catalyst of the invention are selected from amorphous $SiO_2.Al_2O_3$, $Al_2O_3$ and/or $SiO_2$.

Said Y type zeolite in the catalyst of the invention may be a rare earth metal ion exchanged Y (REY) zeolite with a content of rare earth not less than 14 wt % (calculated as $RE_2O_3$), and may also be a stabilized high silica Y type zeolite with a higher silica/alumina mole ratio prepared by various chemical and/or physical method, such as hydrothermal method, acid treatment, framework silicon enriching method, or $SiCl_4$ treatment method.

Said phosphorus and aluminum or phosphorus and magnesium or phosphorus and calcium containing high silica zeolite having a structure of pentasil in the catalyst of the invention is a kind of high silica zeolite containing 2–8 wt % (based on the weight of zeolite) of phosphorus (calculated as $P_2O_5$) and 0.3~3 wt % of aluminum or magnesium or calcium (calculated as oxide), such as ZSM-5, ZSM-8 or ZSM-11 type zeolite, having a silica/alumina mole ratio of preferably 15~60. The said phosphorus and aluminum or phosphorus and magnesium or phosphorus and calcium containing high silica zeolite having a structure of pentasil may also contain 0.3~3 wt % (based on the weight of zeolite) of nickel (calculated as oxide).

The preparation method of the catalyst of the invention is as follows: mixing the precursor of the inorganic oxides with clay according to a predetermined ratio, adding de-cationized water to obtain a slurry with a solid content of 10~50 wt %, adjusting and maintaining the pH value of the slurry to 2~4 using an inorganic acid such as hydrochloric acid, nitric acid, phosphoric acid or sulfuric acid, after aging statically at 20~80° C. for 0~2 hrs adding into it a pre-calculated amount of zeolite, homogenizing, spray drying, washing off the free sodium ions and drying.

Said precursor of the inorganic oxides is selected from aluminum sol, pseudo-boehmite, silica sol or its mixture, and silica-alumina sol or gel.

Said clay can be all kind of clays usually used as a carrier for cracking catalyst, either natural or synthesized, such as kaolin, kaolin polyhydrate, and may optionally be subjected to various chemical and/or physical treatment.

Said inorganic acids are selected from hydrochloric acid, nitric acid, phosphoric acid or sulfuric acid.

Said zeolite is a phosphorus and aluminum or phosphorus and magnesium or phosphorus and calcium containing high silica zeolite having a structure of pentasil or a mixture of said high silica zeolite and a Y type zeolite, wherein the former is a kind of high silica zeolite containing 2~8 wt % (based on the weight of zeolite) of phosphorus (calculated as $P_2O_5$) and 0.3~3 wt % of aluminum or magnesium or calcium (calculated as oxide) such as ZSM-5, ZSM-8 or ZSM-11 type zeolite, having a silica/alumina mole ratio of preferably 15~60.

The said high silica zeolite may also contain 0.3~3% (based on the weight of zeolite) of nickel (calculated as oxide).

The preparation method of the said zeolite is as follows: mixing homogeneously the high silica zeolite having a structure of pentasil with an aqueous solution containing phosphorus and aluminum or phosphorus and magnesium or calcium compounds according to a water/solid weight ratio of 1~3:1, impregnating for 0.5~4 hrs, drying at 100~120° C. and then calcining at 450~650° C. for 1~4 hrs. Nickel on the said high silica zeolite can also be introduced by mixing nickel compound together with phosphorus and aluminum or phosphorus and magnesium or phosphorus and calcium compounds in an aqueous solution and impregnating said high silica zeolite in said aqueous solution. The said high silica zeolites having a structure of pentasil are the type of high silica zeolites of ZSM-5, ZSM-8 or ZSM-11 type having a silica/alumina mole ratio of preferably 15~60. The said phosphorus compound containing aqueous solution is preferably the aqueous solution of phosphoric acid, the aluminum or magnesium or calcium compound containing aqueous solution can be the aqueous solution of the nitrate, hydrochloride and sulfate of these elements, preferably the aqueous solution of nitrate or hydrochloride. The said nickel compounds can be nitrate, hydrochloride, or sulfate.

The Y type zeolite in the catalyst of the invention can be the rare earth metal ion exchanged REY zeolite having a rare earth metal content of not less than 14 wt % (calculated as $RE_2O_3$) based on the weight of the zeolite, and may also be a stabilized high silica Y type zeolite having a higher silica/alumina mole ratio prepared by various chemical method and/or physical method, such as hydrothermal method, acid treatment method, framework silica enriching method, or $SiCl_4$ treatment method.

The catalyst provided by the present invention can attain the same level of yield of light olefins as that of steam thermal cracking reaction at a lower reaction temperature than that of steam thermal cracking reaction. The said catalyst displays the excellent hydrothermal activity-stability as well as the yields of light olefins, especially the yields of $C_2^=$ and $C_3^=$. For example, the said catalyst can achieve a yield of 20 wt % (based on the feed) of $C_2^=$, with the total yields of $C_2^=$~$C_4^=$ being up to 54 wt % under the reaction conditions of 680° C., a catalyst/oil weight ratio of 10 and WHSV (weight hour space velocity) of 10 $hrs^{-1}$, using VGO (vacuum gas oil) as feedstock.

The present invention well be further described with reference to the following examples, which, however, shall not be construed to limit the scope of the present invention.

The phosphorus and aluminum or phosphorus and magnesium or phosphorus and calcium containing high silica zeolite, which may optionally contain nickel, having a structure of pentasil used in the examples is prepared as follows: ion-exchanging the commercial product of ZSM-5 zeolite having a silica/alumina mole ratio of 25 with ammonium nitrate solution according to a weight ratio of zeolite (anhydrous basis): ammonium nitrate:de-cationized water= 1:1:20 at 90° C. for 2 hrs, after filtering and leaching the resultant was ion-exchanged once more to obtain ammonium type of ZSM-5 with the sodium content (calculated as $Na_2O$) of less than 0.15 wt % based on the weight of the zeolite, mixing said homogeneously ammonium type of ZSM-5 with a $H_3PO_4$, de-cationized water and $AlCl_3$ or $MgCl_2$ or $CaCl_2$ containing solution, in which $Ni(NO_3)_2$ may optionally added according to a liquid /solid weight ratio of 2;1, followed by stirring and impregnating for 2 hrs, drying at 120° C., and then calcining at 550° C. for 2 hrs. The resulting ZSM-5 prepared by the above procedure containing 4.9 wt% of $P_2O_5$ and 0.9 wt % of $Al_2O_3$ is marked as P.Al—Z zeolite, the one containing 5.0 wt % of $P_2O_5$ and 1.4 wt % of MgO is marked as P.Mg—Z zeolite, the one containing 4.9 wt % $P_2O_5$ and 2.0 wt % of CaO is marked as P.Ca—Z zeolite. The one containing 5.0 wt % of $P_2O_5$, 1.4 wt % of MgO and 1.2 wt % of NiO is marked as P.Mg.Ni—Z.

EXAMPLE 1~3

These examples demonstrate the preparation and the cracking performance of the catalyst of the present invention using clay as matrix, pseudo-boehmite as binder and single-component zeolite as active component.

Slurrying 13.5 Kg kaolin polyhydrate (a commercial product with a solid content of 73 wt %) with 34.36 Kg de-cationized water, adding 13.5 Kg pseudo-boehmite (a commercial product with a solid content of 64 wt %) and 1.17 L hydrochloric acid (30 wt %), stirring homogeneously, aging statically at 75° C. for 1 hr, maintaining the pH value in the range of 2~4, lowing the temperature to 60° C., adding 15 wt % of pre-prepared P.Al—Z or P.Mg—Z or P.Ca—Z zeolite respectively (anhydrous, based on the weight of catalyst), mixing homogeneously, spray drying, washing off the isolated sodium ions, and drying to obtain catalyst sample A or B or C.

Comparative Sample 1

Using the phosphorus and rare earth metal containing high silica zeolite having a structure of pentasil having a silica/alumina mole ratio of 30, $RE_2O_3$ 2.0 wt %, $P_2O_5$ 5.0 wt %, a commercial product designated as ZRP, as active component instead of P.Al—Z or P.Mg—Z or P.Ca—Z zeolite to prepare comparative sample 1 according to the same procedure and composition used for the preparation of samples A,B and C.

Comparative Sample 2

Using HZSM-5 zeolite, a commercial product having a silica/alumina mole ratio of <55, as an active component instead of the P.Al—Z or P.Mg—Z or P.Ca—Z to prepare comparative sample 2 according to the procedure and composition used for the preparation of samples A, B and C.

Table 1 lists the chemical compositions of sample A,B and C. The evaluation results in a micro-reactor of sample A,B and C after hydrothermal treatment at 800° C. with 100% steam for 4 hrs. are presented in table 2. The reaction conditions used in micro-reactor for evaluating catalyst samples were: reaction temperature 520° C., catalyst/oil weight ratio 3.2, WHSV 16 $h^{-1}$, catalyst loading 5.0 g, the properties of the feed as follows: distillation range 229~340° C., paraffinic hydrocarbon 45.5 wt %, naphthenic hydrocarbon 35.7 wt %, aromatic hydrocarbon 18.2 wt %, colloid 0.6 wt %.

Table 2 shows that the catalyst of the invention displays higher activity-stability; with the same zeolite content present in the catalyst and same hydrothermal treatment severity, the activity of the catalyst of the invention is 14 unit and 19 unit higher than that of comparative samples 1 and 2 respectively. The catalyst of the invention also exhibits higher $C_2^=$ selectivity. The $C_2^=$ yield of the catalyst of the invention is 2.5 times and 4 times that of comparative samples 1 and 2 respectively, and the $C_2^=/C_3^=$ ratio in the yields obtained by the catalyst of the invention is 3 times that of comparative sample 1 or 2.

EXAMPLE 4

This example relates to the preparation and the cracking performance of the catalyst of the invention using clay as matrix, pseudo-boehmite as binder and dual-zeolites as active component.

Slurring 15.3 Kg kaolin polyhydrate with 34.7 Kg de-cationized water, adding 19.4 Kg pseudo-boehmite and 1.65 L hydrochloric acid, stirring homogeneously, aging statically at 75° C. for 1 hr, maintaining the pH value in the range of 2~4, lowing the temperature to 60° C., adding 3.0 Kg (anhydrous basis) P.Mg—Z zeolite, 0.8 Kg (anhydrous basis) SRY zeolite (commercial name, stabilized Y type zeolite) and 5 Kg de-cationized water, homogenizing, spray drying, washing off the free sodium ions, and drying the resultant to obtain catalyst sample D.

TABLE 1

| Catalyst sample | A | B | C | Comparative 1 | Comparative 2 |
|---|---|---|---|---|---|
| Composition, wt. % | | | | | |
| Kaolin clay | 59.5 | 59.5 | 59.5 | 59.5 | 59.5 |
| $Al_2O_3$ | 25.5 | 25.5 | 25.5 | 25.5 | 25.5 |
| Zeolite | | | | | |
| P · Al-Z | 15.0 | | | | |
| P · Mg-Z | | 15.0 | | | |

TABLE 1-continued

| Catalyst sample | A | B | C | Comparative 1 | Comparative 2 |
|---|---|---|---|---|---|
| P · Ca-Z | | | 15.0 | | |
| ZRP | | | | 15.0 | |
| HZSM-5 | | | | | 15.0 |

TABLE 2

| Catalyst sample | A | B | C | Comparative 1 | Comparative 2 |
|---|---|---|---|---|---|
| Activity, wt % | 63 | 62 | 63 | 49 | 44 |
| Product yield, wt % | | | | | |
| Cracking gas wherein, | 27.46 | 27.01 | 27.19 | 21.72 | 16.76 |
| $C_2^=$ | 3.30 | 3.16 | 3.18 | 1.35 | 0.82 |
| $C_3^=$ | 6.74 | 7.34 | 6.67 | 8.85 | 6.50 |
| $C_4^=$ | 3.97 | 4.61 | 4.04 | 6.79 | 5.63 |
| $C_2\sim C_4$, wt % | 14.01 | 15.11 | 13.89 | 16.99 | 12.95 |
| $C_2^=/C_3^=$ | 0.49 | 0.43 | 0.48 | 0.15 | 0.13 |

Comparative Sample 3

Using the phosphorus and rare earth containing high silica zeolite having a structure of pentasil, known has ZRP (commercial name) as active component instead of P.Mg—Z zeolite used in example 4 to prepare comparative sample 3 according to the same procedure and composition used for the preparation of sample D.

Table 3 exhibits the composition of catalyst D and comparative sample 3. The evaluation results in micro-reactor for sample D and comparative sample 3 after hydrothermal treatment at 800° C. with 100% steam for 4 Hrs arc indicated in table 4. The evaluation conditions were same to those used in example 1-3.

Table 4 shows that the $C_2^=$ yield and the $C_2^=/C_3^=$ ratio in the yields obtained by the catalyst of the invention is 2.5 times and 3 times that of comparative sample 3 respectively.

TABLE 3

| Catalyst sample | D | Comparative 3 |
|---|---|---|
| Composition, wt. % | | |
| Kaolin clay | 53.0 | 53.0 |
| $Al_2O_3$ | 28.0 | 28.0 |
| Zeolite, wt % | | |
| P · Mg-Z | 15.0 | |
| ZRP | | 15.0 |
| SRY | 4.0 | 4.0 |

TABLE 4

| Catalyst sample | D | Comparative 3 |
|---|---|---|
| Activity, wt % | 73 | 72 |
| Cracking gas of, wt % wherein, | 33.4 | 25.39 |
| $C_2^=$ | 3.29 | 1.32 |
| $C_3^=$ | 7.61 | 8.99 |
| $C_4^=$ | 4.88 | 6.53 |
| $C_2\sim C_4$, wt % | 15.78 | 16.84 |
| $C_2^=/C_3^=$ | 0.43 | 0.15 |

EXAMPLE 5~7

These examples relate to the preparation and cracking performance in fixed fluidized bed (FFB) unit of the catalyst of the invention using clay as matrix pseudo-boehmite as binder, and single component zeolite as active component.

Slurrying 3.39 Kg kaolin polyhydrate with 11.45 Kg de-cationized water, adding 2.10 Kg pseudo-boehmite and 0.39 L hydrochloric acid, stirring homogeneously, aging statically at 75° C. for 1 hr, maintaining the pH value in the range of 2~4, lowering the temperature to 60° C., adding 0.675 Kg (anhydrous basis) P.Al—Z or P.Mg—Z or P.Ca—Z zeolite respectively, mixing homogeneously, spray drying, washing off the free sodium ions, and drying to obtain catalyst sample E or F or G.

Comparative Sample 4

Using the phosphorus and rare earth containing high silica zeolite having a structure of pentasil, ZRP, as active component instead of the zeolite used in the catalyst of the invention to prepare the comparative sample 4 according to the procedure and composition used in examples 5~7.

The composition of the above catalyst samples are listed in table 5. Table 6 describes the results from FFB unit of the catalyst samples E,F and G after hydrothermal treatment at 800° C., 100% steam for 17 hrs. The comparative sample 4 was hydrothermal treated at 760° C., 100% steam for 10 hrs. The conditions of the evaluation were: reaction temperature 720° C., catalyst/oil weight ratio 10, WHSV 10 hr$^{-1}$, water injection 80 wt %, catalyst load 180 g, the distillation range of the feed for FFB test is 346~546° C., UOP K value of the feed 12.4, CCR (Conradson Carbon Residue) 0.15 wt %, density (20° C.) 0.8730 g/cm$^3$.

The data from table 6 indicate that $C_2^=$ yield of the catalyst of the invention is increased by 3~5 wt %.

12 Kg water glass (SiO$_2$ content of 243 g/l, density 1.246) was diluted by 43 Kg de-cationized water, mixing homogeneously, adding 1.9 Kg kaolin polyhydrate and 0.75 Kg (anhydrous basis) P.Al—Z zeolite, siring homogeneously, adding slowly to it 3 Kg aluminum sulfate solution (alumina content of 93.5 g/l, density 1.287) and 5.6 Kg de-cationized water. The pH value of the sample was controlled at 10~11 and aging dynamically for 30 min, adding slowly to it 2.6 Kg aluminum sulfate solution, controlling the pH value in the range of 4~5, then aging dynamically once more for 20 min. After filtering the above mixture, slurring the resultant with 15 Kg de-cationized water, spray drying, washing and drying finally to obtain the catalyst sample H.

Using P.Mg—Z zeolite or P.Ca—Z zeolite instead of P.Al—Z zeolite to obtain the catalyst sample I or J.

Comparative Sample 5

Using phosphorus and rare earth metal containing high silica zeolite having a structure of pentasil, ZRP, as active component instead of the zeolite used in the catalyst of the invention to prepare the comparative sample 5 according to the procedure and composition used in examples 8~10.

Table 7 lists the composition of the above catalyst samples. The evaluation results of the above catalysts after hydrothermal treatment at 800° C., 100% steam for 17 hrs are illustrated in table 8, the evaluation conditions are same to that of example 5–7 except that the reaction temperature was 700° C.

The data in table 8 show that the yields of cracking gas, $C_2^=$, and $C_2^=~C_4^=$ by the catalyst of the invention are 2~3 wt %, 2 wt % and 4 wt % higher respectively than those of comparative sample 5.

TABLE 5

| Catalyst sample | E | F | G | Comparative 4 |
|---|---|---|---|---|
| Composition, wt % | | | | |
| Kaolin clay | 55 | 55 | 55 | 55 |
| Al$_2$O$_3$ | 30 | 30 | 30 | 30 |
| Zeolite | | | | |
| P · Al-Z | 15 | | | |
| P · Mg-Z | | 15 | | |
| P · Ca-Z | | | 15 | |
| ZRP | | | | 15 |

TABLE 6

| Catalyst sample | E | F | G | Comparative 4 |
|---|---|---|---|---|
| Product yield, wt % | | | | |
| Cracking gas wherein, | 74.30 | 68.33 | 69.27 | 63.88 |
| $C_2^=$ | 22.70 | 21.00 | 21.38 | 18.35 |
| $C_3^=$ | 20.88 | 18.88 | 18.75 | 20.97 |
| $C_4^=$ | 8.56 | 7.81 | 8.18 | 10.42 |
| Gasoline (C$_5$~221° C.) | 12.07 | 16.05 | 14.68 | 13.80 |
| LCO (221~330° C.) | 2.66 | 4.17 | 4.25 | 8.77 |
| Heavy Oil (>330° C.) | 1.04 | 1.42 | 1.97 | 8.52 |
| Coke | 9.93 | 10.03 | 9.83 | 5.03 |
| Conversion, wt % | 96.30 | 94.41 | 93.78 | 82.71 |
| $C_2^= + C_3^= + C_4^=$, wt % | 52.14 | 47.61 | 48.31 | 49.74 |
| $C_2^=/C_3^=$ | 1.09 | 1.11 | 1.14 | 0.87 |

TABLE 7

| Catalyst sample | H | I | J | Comparative 5 |
|---|---|---|---|---|
| Composition, wt % | | | | |
| Kaolin clay | 28 | 28 | 28 | 28 |
| SiO$_2$.Al$_2$O$_3$ | 57 | 57 | 57 | 57 |
| Zeolite | | | | |
| P · Al-Z | 15 | | | |
| P · Mg-Z | | 15 | | |
| P · Ca-Z | | | 15 | |
| ZRP | | | | 15 |

TABLE 8

| Catalyst sample | H | I | J | Comparative 5 |
|---|---|---|---|---|
| Product yield, wt % | | | | |
| Cracking gas wherein, | 69.32 | 69.70 | 68.61 | 66.37 |
| $C_2^=$ | 20.41 | 20.77 | 19.81 | 18.31 |
| $C_3^=$ | 22.52 | 22.47 | 22.72 | 21.77 |
| $C_4^=$ | 10.61 | 10.69 | 10.53 | 9.32 |
| Gasoline (C$_5$~221° C.) | 15.05 | 15.22 | 17.84 | 14.97 |
| LCO (221~330° C.) | 5.16 | 5.33 | 3.73 | 5.87 |
| Heavy Oil (>330° C.) | 4.10 | 3.65 | 2.64 | 4.89 |
| Coke | 6.37 | 6.10 | 7.18 | 7.90 |
| Conversion, wt % | 90.74 | 91.02 | 93.63 | 89.24 |
| $C_2^= + C_3^= + C_4^=$, wt % | 53.54 | 53.93 | 53.06 | 49.40 |

EXAMPLES 8~10

These examples describe the preparation and the cracking performance in FFB unit of the catalyst of the invention using clay as matrix and amorphous silica alumina as binder.

EXAMPLE 11~12

These examples illustrate the preparation and cracking performance of the catalyst of the present invention using clay as matrix, pseudo-boehmite and aluminum sol as binder, and double-components of zeolite as active component.

Slurrying 3.26 Kg kaolin polyhydrate with 10.7 Kg de-cationized water, adding 1.82 Kg pseudo-boehmite and 0.337 L hydrochloric acid, stirring homogeneously, aging statically at 75° C. for 1 hr, maintaining the pH value in the range of 2~4, lowering the temperature to 60° C., adding 0.642 Kg aluminum sol (a commercial product with $Al_2O_3$ content of 0.2164 wt %), stirring homogeneously, adding 0.675 Kg (anhydrous basis) P.Mg—Z zeolite and 0.135 Kg (anhydrous basis) SRY zeolite and 3.68 Kg de-cationized water, homogenizing, spray drying washing off the isolated sodium ions, and drying to obtain the catalyst sample K.

Using P.Mg.Ni—Z zeolite instead of P.Mg—Z zeolite to prepare catalyst sample L.

Comparative Sample 6

Using the phosphorus and rare earth containing high silica zeolite having a structure of pentasil, ZRP, as active component instead of the zeolite used in the catalyst of the invention to prepare the comparative sample 5 according to the procedure and composition used in example 11~12.

Table 9 lists the composition of the above catalyst samples. The evaluation results from FFB unit of the above catalyst samples after hydrothermal treatment at 800° C., 100% steam for 17 hrs are described in table 10, the evaluation conditions are same to that of example 5–7 except that the reaction temperature was 680° C.

The data in table 10 show that the yields of $C_2^=$ and $C_2^=$~$C_4^=$ by the catalyst of the invention are 2~5 wt % and 1.5~4.5 wt % higher respectively than those of comparative sample 6.

TABLE 9

| Catalyst sample | K | L | Comparative 6 |
|---|---|---|---|
| Composition, wt % | | | |
| Kaolin clay | 53 | 53 | 53 |
| $Al_2O_3$ | 29 | 29 | 29 |
| Zeolite | | | |
| P · Mg-Z | 15 | | |
| P · Mg · Ni-Z | | 15 | |
| ZRP | | | 15 |
| SRY | 3 | 3 | 3 |

TABLE 10

| Catalyst sample | K | L | Comparative 6 |
|---|---|---|---|
| Product yield, wt % | | | |
| Cracking gas wherein, | 73.17 | 70.48 | 69.06 |
| $C_2^=$ | 19.20 | 22.26 | 17.55 |
| $C_3^=$ | 27.83 | 22.66 | 24.88 |
| $C_4^=$ | 11.30 | 10.37 | 11.31 |
| Gasoline ($C_5$~221° C.) | 10.07 | 14.36 | 10.09 |
| LCO (221~330° C.) | 4.52 | 3.48 | 3.93 |
| Heavy Oil (>330° C.) | 3.23 | 3.40 | 4.07 |
| Coke | 9.01 | 8.28 | 12.85 |
| Conversion, wt % | 92.25 | 93.12 | 92.00 |
| $C_2^=$ + $C_3^=$ + $C_4^=$, wt % | 58.33 | 55.29 | 53.74 |

EXAMPLE 13

This example illustrates the preparation and cracking performance of the catalyst of the present invention using clay as matrix, pseudo-boehmite and aluminum sol as binder and double component of zeolite as active component. The catalyst sample 13 is prepared in a pilot plant of catalyst preparation. Slurrying 132.4 Kg kaolin polyhydrate with 428 Kg de-cationized water, adding 72.8 Kg pseudo-boehmite and 13.48 L hydrochloric acid, stirring homogeneously, aging statically at 75° C. for 1 hr, maintaining the pH value in the range of 2~4, lowing temperature to 60° C., adding 24.96 Kg aluminum sol, stirring homogeneously, adding 36 Kg (anhydrous basis) P.Mg—Z zeolite and 63 Kg (anhydrous basis) SRY and 147 Kg de-cationized water, homogenizing, spray drying, washing off the free sodium ions and drying to obtain the catalyst sample M.

Table 11 lists the composition of catalyst sample M. The evaluation results from pilot plant riser of catalytic pyrolysis cracking of sample M after hydrothermal treatment at 790° C., 100% steam for 27 hrs in a pilot plant hydrothermal treating are described in table 12. The catalyst inventory of the pilot plant riser is 55 Kg. The properties of the feedstock used are as follows: density (20° C.) 0.8826 g/cm³, carbon residue 2.9 wt %, freezing point 46° C., saturate hydrocarbon 59.8 wt %, aromatic hydrocarbon 26.4 wt %, colloid 13.2 wt %, asphaltene 0.6 wt %.

TABLE 11

| Catalyst sample | M |
|---|---|
| Composition, wt % | |
| Kaolin clay | 51.5 |
| $Al_2O_3$ | 25 |
| Zeolite | |
| P · Mg-Z | 20 |
| SRY | 3.5 |

TABLE 12

| Catalyst sample | M |
|---|---|
| Operation condition | |
| reaction temp., ° C. | 660 |
| reaction pres.(gauge), Kg/cm² | 0.07 |
| feeding rate, Kg/hr | 2.2 |
| water injection (based on total feed), wt % | 80 |
| catalyst/oil ratio | 37 |
| residual time, sec. | 1.4 |
| regeneration temp., ° C. | 720 |
| feed preheat temp., ° C. | 333 |
| Product yields, wt | |
| cracking gas | 61.53 |
| wherein dry gas | 40.34 |
| liquefied gas | 21.19 |
| liquid product | 26.92 |
| coke | 10.30 |
| loss | 1.25 |
| total | 100 |
| Gas product yields, wt | |
| $CH_4$ | 12.96 |
| $C_2H_4$ | 21.86 |
| $C_3H_6$ | 15.04 |
| $C_4H_8$ | 5.70 |
| $C_2^=$ + $C_3^=$ + $C_4^=$, | 42.60 |

What is claimed is:

1. A catalyst for catalytic pyrolysis process for the production of light olefins, characterized in that it comprises 10~70 wt % (based on the weight of the catalyst) of clay, 5~85 wt % of inorganic oxides and 1~50 wt % of zeolite, wherein said zeolite comprises >0~25 wt % Y type zeolite and 75~<100 wt % of phosphorus and aluminum or phosphorus and magnesium or phosphorus and calcium containing high silica zeolite having a structure of pentasil, said high silica zeolite is ZSM-5, ZSM-8 or ZSM-11 type zeolite containing 2~8 wt % (based on the weight of the zeolite) of phosphorus and 0.3~3 wt % of aluminum or magnesium or calcium (calculated as the oxides), having a silica/alumina mole ratio of 15~60.

2. A catalyst according to claim 1, wherein said clay is selected from kaolin or kaolin polyhydrate clay.

3. A catalyst according to claim 1, wherein said inorganic oxides is selected from amorphous silica-alumina, alumina or silica.

4. A catalyst according to claim 1, wherein said Y type zeolite is selected from REY (rare earth metal ion exchanged Y) zeolite with a content of rare earth metal not less than 14 wt % (calculated as $RE_2O_3$) or a stabilized high silica Y type zeolite with relatively high silica/alumina mole ratio prepared by chemical and/or physical treatment.

5. A catalyst according to claim 1, wherein said phosphorus and aluminum or phosphorus and magnesium or phosphorus and calcium containing high silica zeolite having a structure of pentasil also contains 0.3–3 wt % (based on the weight of the zeolite) of nickel(calculated as the oxide).

6. A method for the preparing of the catalyst according to claim 1, characterized by the steps of mixing a precursor of the inorganic oxides with clay to obtain a slurry with a solid content of 10~50 wt %, adjusting with an inorganic acid and maintaining the pH value of the slurry at 2~4, aging statically at 20~80° C. for 0~2 hrs, adding zeolites, homogenizing, spray drying, washing and drying.

7. A preparation method according to claim 6, wherein the precursor of the inorganic oxides is selected from the group consisting of aluminum sol, pseudo-boehmite, silica sol and the mixtures thereof, and silica alumina sol or gel.

8. A preparation method according to claim 6, wherein said pentasil high silica zeolite is selected from the group consisting of ZSM-5, ZSM-8 and ZSM-11 type zeolites containing 2~8 wt % of phosphorus (based on the weight of zeolite) and 0.3–3 wt % of aluminum or magnesium or calcium (calculated as the oxides).

9. A preparation method according to claim 8, wherein said pentasil high silica zeolite also contains 0.3–3 wt % (based on the weight of the zeolite) of nickel (calculated as the oxide).

10. A preparation method according to claim 8, characterized in that the preparation process of said phosphorus and aluminum or phosphorus and magnesium or phosphorus and calcium containing pentasil high silica zeolite comprises the steps of: adding ZSM-5 or ZSM-8 or ZSM-11 type zeolite into an aqueous solution containing phosphorus and aluminum or phosphorus and magnesium or phosphorus and calcium compounds with a water/solid ratio of 1~3:1, mixing homogeneously, impregnating for 0.5~4 hrs, drying at 100~120° C., and calcining at 450~650° C. for 14 hrs.

11. A preparation process according to claim 10, wherein said phosphorus compound containing aqueous solution is phosphoric acid aqueous solution, and said aluminum or magnesium or calcium compound containing aqueous solutions are selected from aqueous solutions of their nitrates, hydrochloride or sulfates.

12. A catalyst according to claim 1, wherein the high silica zeolite is a phosphorus and aluminum or phosphorus and calcium high silica zeolite.

13. A catalyst according to claim 1, wherein the high silica zeolite is impregnated with phosphorus and aluminum, phosphorus and magnesium or phosphorus and calcium.

* * * * *